Oct. 21, 1958 L. F. STRIHAFKA 2,856,772
VERTICAL VELOCITY METER
Filed Oct. 27, 1955 3 Sheets-Sheet 1

INVENTOR
LOUIS F. STRIHAFKA
BY
Herbert H. Thompson
his ATTORNEY.

United States Patent Office 2,856,772
Patented Oct. 21, 1958

2,856,772

VERTICAL VELOCITY METER

Louis F. Strihafka, West Hempstead, N. Y., assignor to Sperry Rand Corporation, a corporation of Delaware Application October 27, 1955, Serial No. 543,186

16 Claims. (Cl. 73—179)

This invention relates to means for accurately measuring the rate of climb of a craft (or descent which may be regarded as a negative climb), such as a high speed aircraft in which rates of climb may be very rapid. While barometric rate of climb devices are known, such are very slow in responding to changes in the rate of climb, that is, to vertical accelerations of the craft, and hence such devices do not give the aviator an accurate instantaneous reading of his vertical rate.

In my invention, I propose to employ as the primary rate of climb device a novel gyroscopic vertical accelerometer, that is, a gyroscope so designed that its rate of precession is proportional to the vertical acceleration of the craft. Therefore, the amount and direction of precession of the gyroscope at any instant represents the rate of climb at that instant (the time integral of acceleration). Such gyroscope is preferably in the form of a rotor mounted for spinning about a normally horizontal axis with freedom about a second horizontal axis normal to said spin axis and preferably situated to one side of the center of gravity of the system so that the gyroscope is subject to vertical acceleration forces. The gyroscope is also mounted for freedom about a vertical axis and hence will precess about its vertical axis when subject to vertical acceleration forces acting about its horizontal gimbal axis. The gravitational unbalance otherwise caused by such unbalance is normally balanced by a biasing spring so that the spin axis remains normally horizontal.

As an indicator of rate of climb or vertical velocity, such a gyroscope is subject to a number of errors and it is one of the objects of the invention to overcome substantially all of such errors by a correction device not subject to such errors.

First, such a gyroscope is subject to error because the acceleration of gravity (G) itself varies under different conditions and from point to point on the earth's surface. Thus, the local gravity decreases slightly with altitude and varies at different latitudes (being greatest at the poles) and also varies with the centrifugal acceleration due to the speed of the craft following the curved surface of the earth. "G" also varies due to the Coriolis effect. By my invention, all of these errors due to variations in G are taken care of by employing, in addition, another means for measuring vertical acceleration or vertical rate, and monitoring the output of the gyroscopic vertical accelerometer by said other means. For this purpose, I refer a barometric rate of climb indicator as a monitoring or slaving device for the gyroscopic vertical accelerometer, since a barometric accelerometer is not affected by variations in G. While its direct response to vertical acceleration is nil, it responds to the effect of vertical velocity, but only after a measurable change in altitude has taken place as a result of climb or dive.

Such a gyroscope is also subject to wandering and other errors due to bearing friction, unbalance, gimbal errors, earth's rate effect, and the meridian convergence effect. The gimbal error effect is taken care of according to my invention by mounting the gyroscope on a stabilized platform so that the gimbal or vertical ring remains vertical. The other deviating effects noted are taken care of by the slaving of the gyroscope, as stated, to the barometric rate of climb device through special circuitry. Since my gyroscopic accelerometer immediately responds to acceleration and changes in acceleration, and smoothly integrates the same to give vertical velocity, it is hence employed to give the primary vertical velocity signal but it is slowly corrected by the barometric rate of climb device acting through a "washout" torquer so that long term errors in indicated vertical velocity are avoided.

Referring to the drawings illustrating several forms of my invention,

Figure 1:
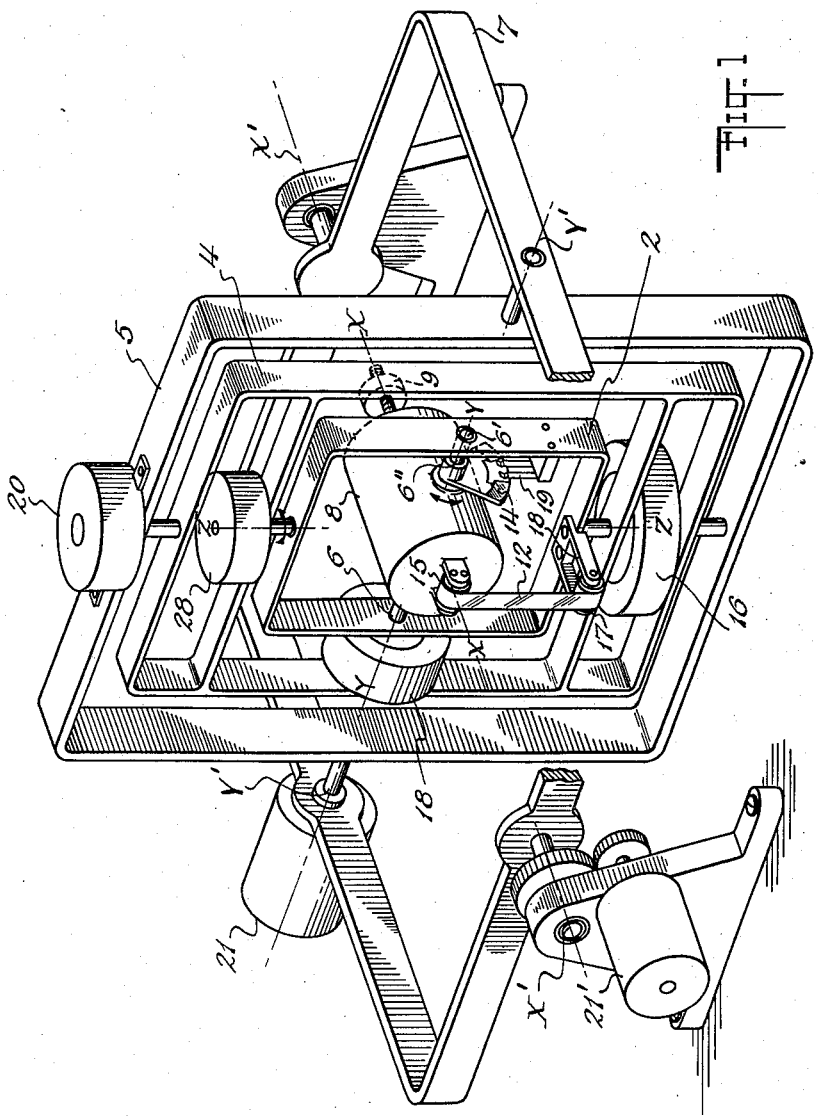
Fig. 1 is a diagrammatic perspective view of one form of my gyroscopic rate of climb device which I term a vertical integrating gyroscopic accelerometer.

In Fig. 1, the gyroscopic apparatus is shown diagrammatically without attempting to show many refinements in the system not a part of this invention. The gyroscope is shown as having a vertical ring 2 mounted for freedom about a vertical axis Z—Z in an azimuth-stabilized ring 4, mounted within a vertically stabilized ring 5. The gyroscope is supported for freedom about a horizontal axis Y—Y by bearings 6, 6' which pivot the rotor bearing case or frame 8 in the vertical ring 2. Preferably the center of gravity of said frame is caused to lie to one side of axis Y—Y, as represented by the adjustable eccentric weight 9, so that the gyroscope is unbalanced about said horizontal axis and hence subject to vertical acceleration forces. The rotor of the gyroscope (not shown) is mounted for spinning about a second normally horizontal axis X—X within said case 8 and the spin axis is normally maintained horizontal by a biasing spring 12 of sufficient tension to maintain the spin axis horizontal when no acceleration forces other than gravity are present. For accurate results, spring 12 should have a substantially constant spring force regardless of the amount of its extension, as otherwise "G" would be over or underbalanced in case the gyro spin axis and the vertical ring became relatively inclined. Such a spring is shown in the form of a steel ribbon or tape cupped transversely along its length and anchored at one end to a stationary drum or pulley 15 secured to rotor bearing case 8 and at its other end wound around a pulley 17 rotatably mounted on a bracket 18 secured to vertical ring 2. Such a spring will tend to wind itself upon the drum 15 and pulley 17 and in doing so exerts a constant torque about the axis Y—Y on the gyro designed to balance "G."

As is usual in such gyroscopes, the spin axis is normally maintained level by means of a tilt detector acting about the horizontal axis Y—Y which controls a levelling torquer 16 acting about the vertical axis Z—Z in a manner well understood in the art. The tilt detector may be in the form of a contact segment 14 or commutator secured to a trunnion 6" of the rotor case 8 and brushes 19 mounted on vertical ring 2 (see also Fig. 2).

Ring 4 is maintained fixed in azimuth by a repeater motor 20 on ring 5 and connected to one of the vertical trunnions of ring 4. Said motor is actuated from a transmitter on a remote gyro magnetic compass (not shown) so that ring 4 is fixed in azimuth, i. e., it does not turn with the aircraft. Except when the device is actually measuring vertical velocity, the gyroscope is slaved to ring 4 in azimuth by means hereinafter described so that at the start of a measuring operation, the spin axis is always N-S (or E-W) and the precession measuring potentiometer 28 hereinafter described is centralized or zeroed.

As stated above, the gyroscope is preferably mounted in a stabilized ring 5 so that the gimbal axes are never tilted. This ring is shown as journalled in gimbal ring 7 on axis Y'—Y', ring 7 being journalled in turn in a fixed support on axis X'—X'. It may be stabilized directly by a gyroscope or gyroscopes or remotely by repeaters 21, 21' actuated from transmitters on a gyroscopically stabilized platform (not shown). An example of such a gyroscopic platform which remotely controls a second stabilized platform (such as 5) is shown in the patent to Hays No. 2,591,697, dated April 8, 1952, for Stable Reference Apparatus, which is also stabilized in azimuth from some form of magnetic compass.

As stated above, such a gyroscope will measure accurately and instantaneously vertical accelerations because when such occur the gyroscope will precess around the vertical axis Z—Z at a rate proportional to the magnitude of the vertical acceleration in a direction dependent upon the sign of the acceleration (whether up or down, i. e., positive or negative) and the amount of precession will be the time integral of such rate, or in other words, an indication of the vertical velocity in accordance with the well known equation $v=k\int a\, dt$.

As pointed out above, however, such indicated vertical velocity will be subject to errors due to the variations in G and to errors in the gyroscope itself, to correct which I employ a washout torquer 18 which exerts a counteractive or corrective torque about the horizontal axis supplementing or opposing that due to gravity and controlled primarily from a barometric rate of climb device.

Figure 2:
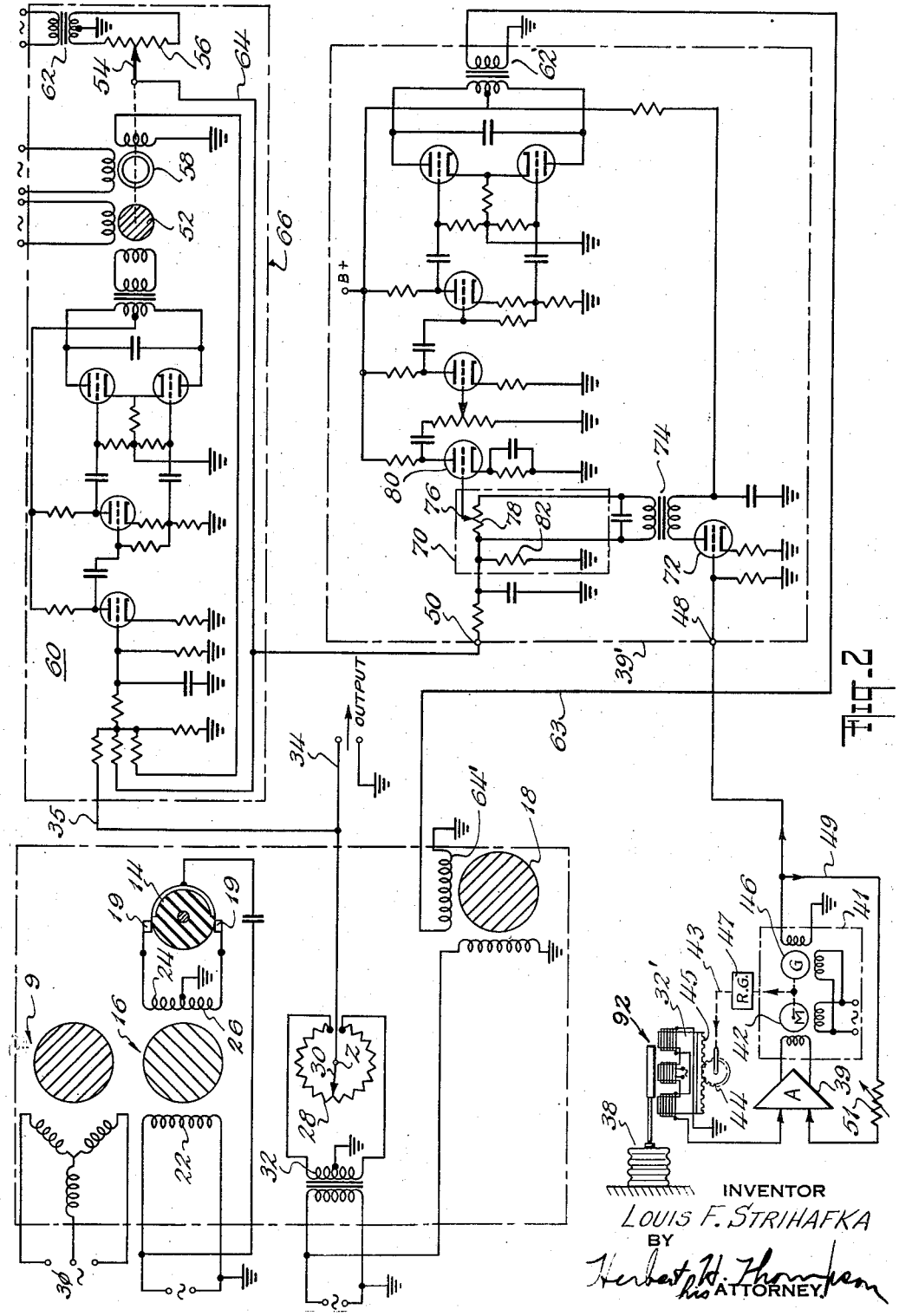
Fig. 2 is a simplified wiring diagram showing the slaving connections between the gyroscopic accelerometer device and a barometric rate of climb device.

Turning now to Fig. 2, a three-phase supply is shown for energizing the motor 9 spinning the gyro rotor and a single phase supply is shown for levelling torquer 16 and washout torquer 18. The levelling torquer 16 has a continuously excited field winding 22 and opposed variably excited control windings 24, 26, one of which is excited from commutator 14 on tilt of the gyroscope in one direction and the other of which is excited with a reverse phase on tilt of the gyro in the opposite direction so that the torque is reversed about the vertical axis on opposite tilts, thereby maintaining the gyroscope level.

The pick-off whose output measures the amount and direction of precession of the gyroscope about its vertical axis and hence vertical velocity is shown as a circular potentiometer 28 having its wiper 30 connected to the vertical axis of the gyroscope. The secondary winding 32 of the exciting transformer is center-tapped to ground and the outer ends connected to the two ends of the potentiometer winding so that when the wiper is at the midpoint of the resistor, no signal is transmitted, but upon displacement clockwise for instance, a linearly increasing signal of one phase will be transmitted through lead 34, and upon counterclockwise movement a linearly increasing signal of opposite phase will be transmitted. This signal at any instant represents the integrated vertical acceleration or, in other words, the rate of climb (or dive) as detected by the gyroscope, which output appears across lead 34 and ground.

If the output of the gyro as seen by the potentiometer 28 were used without further correction, the signal output would be subject to serious cumulative errors, to avoid which I secure a corrective signal for causing a corrective torque on the gyro, by comparing the output of the potentiometer 28 (smoothed as hereinafter described) with the rate of climb obtained from a network including a barometric unit 38 having a pick-off 92 and a rate of change of altitude or rate of climb unit 41. Such barometric units are known in the art, for example, as shown in U. S. Letters Patent No. 2,729,780, to Harry Miller and Robert D. Love, issued January 3, 1956, for Altitude Control for Automatic Pilots. In fact, other means for obtaining altitude and altitude rate might be used such as a radio altimeter with rate circuits. In the diagram, the barometric unit 38 is shown with an inductive "E" pick-off 92, 32', the output of which is amplified in amplifier 39 and the rate of change of this output is shown as obtained from the rate generating and smoothing unit 41. This unit is shown as of the conventional motor speed-generator type having a motor 42 driven from the output of the amplifier 39 and having a mechanical follow-back connection as represented by the dotted line 43 to drive pinion 44 of rack 45 on the adjustable portion 32' of the "E" pick-off unit. Preferably a large reduction gearing 47 is interposed in connection 43. Motor 42 also drives speed generator 46, the output of which reverses in phase with the direction of rotation and the amplitude of its output varies with the speed of rotation.

It is well known that the response of an aneroid barometer to altitude changes is sluggish and more or less intermittent or jumpy because the barometer unit does not sense a suddenly introduced vertical velocity for an appreciable time, i. e., until the altitude has changed appreciatively. To allow for this characteristic, I employ the aforesaid large reduction gearing 47 and also introduce a follow-back damping signal from the output of generator 46 to the amplifier 39, as shown by lead 49. The strength of the follow-back signal may be varied by placing a variable resistor 51 in the circuit. By this or similar means, the output is delayed and smoothed to whatever degree is necessary. This output of generator 46 is shown as supplied to an input terminal 48 of the washout amplifier unit 39'.

To said washout unit is also supplied at terminal 50 an opposing signal proportional to the vertical velocity signal in output lead 34, in order to obtain an error signal in the two vertical velocities supplied. Preferably a smoothing unit 66 is interposed between the output lead 34 and the terminal 50 which may be of conventional form and is shown as having a motor 52 therein driven through a conventional amplifier from the input lead 35 connected to lead 34 and driving the slider 54 of a resistor 56. Preferably also, motor 52 drives the speed generator 58, the output of which is fed back into the amplifying unit 60 to give the unit a smoothing action comparable to that of unit 41. Resistor 56 is energized from a center-tapped supply transformer 62. The output of said resistor is supplied over lead 64 to the aforesaid terminal 50.

Within the washout amplifier 39' is a conventional summing circuit 70 which matches in effect the barometrically obtained vertical velocity signal supplied to terminal 48 and the accelerometer obtained signal supplied to terminal 50 after each signal has been smoothed and averaged as aforesaid. The signal from terminal 48 is shown as amplified in tube 72 and transformer 74, the output of which is applied across the resistor 78. The grid of tube 80 is shown as connected through a tap 76 on resistor 78 and resistor 82 to ground and the signal from terminal 50 is shown as applied between resistors 78 and 82 to ground, so that the voltage supplied to the grid of tube 80 is the difference between a selected portion of the voltage supplied across resistor 78 (determined by the position of tap 76) and the voltage supplied by terminal 50. Therefore, it represents the error signal between the two signals supplied at 48 and 50, in other words, the error between the rate of climb signal obtained from the gyro vertical accelerometer and the rate of climb signal obtained from the barometer. This error signal is applied to the grid of tube 80 and is further amplified in a conventional amplifier as shown and is supplied from transformer 62' through lead 63 to the field 64' of washout torquer 18. Thus, it applies a corrective torque on the gyro, correcting the applied vertical acceleration torque so as to correct the final vertical velocity signal in lead 34. The final and corrected output of the potentiometer 28, therefore, will be the integrated, corrected vertical velocity signal.

Figure 3:
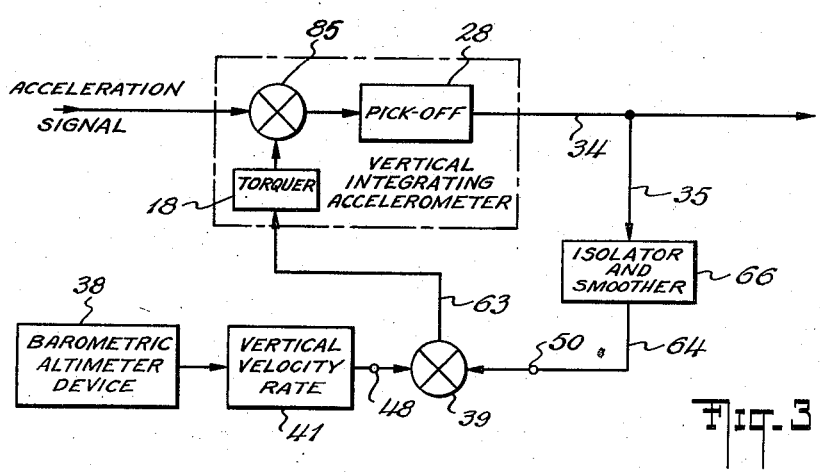
Fig. 3 is a flow diagram illustrating in simplified form the flow of the signals in the system.

A simplified flow diagram of my system is shown in Fig. 3, in which the elements are correspondingly labelled. The net torque on the gyro is represented at 85 as made up of the acceleration signal produced by the action of the acceleration forces on the unbalanced mass of the gyro 8 and the correction torque exerted by the washout torquer 18 which is controlled in turn by the error (obtained by washout amplifier 39) between the rate of climb as measured by the barometric means 38 and 41 and the rate of climb as measured by the gyroscopic accelerometer as supplied to input 50 from smoother 66. The corrected output of the meter produced by potentiometer 28 is supplied to output lead 34.

Figure 4:
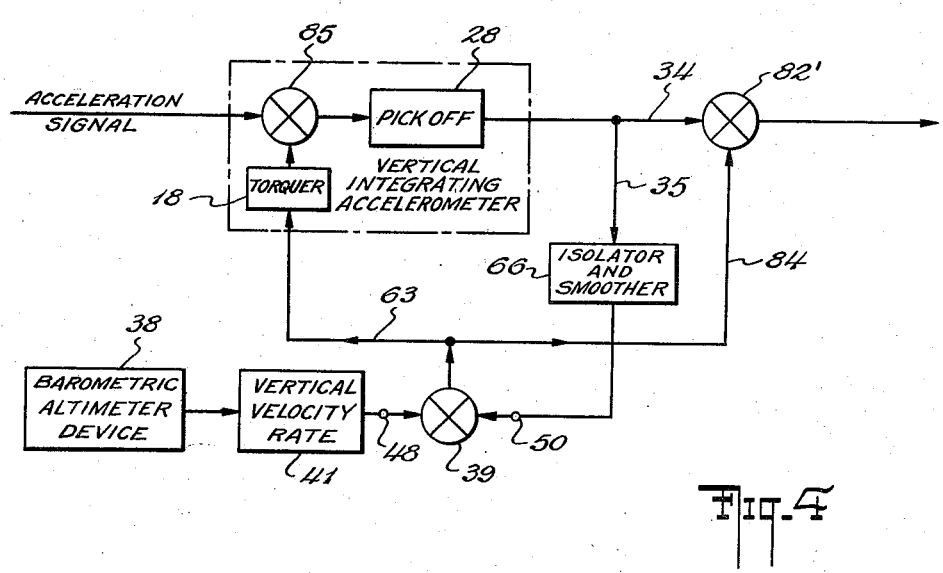
Fig. 4 is a similar flow diagram showing an improved form of the invention.

In this system, however, continuing error in the output of the gyroscope such as caused by false accelerations or friction would appear in the corrected signal as a small steady-state or stand-off error. To avoid this, I employ the improved system represented by the flow diagram of Fig. 4. From this diagram, it will be seen that it has in addition to the elements of Fig. 3 a comparison device 82' placed in the final output circuit 34 and into which is also fed through lead 84 a portion of the feedback signal appearing in lead 63, so that if there is a continuing correction signal going to the torquer, it is introduced as an additional correction factor into the final output to eliminate the residual or stand-off error.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A meter for measuring vertical velocity including vertical acceleration responsive means for deriving a vertical velocity signal comprising a gyroscope having, mutually perpendicular, torque input and precession output axes, signal means responsive to precession of the gyroscope providing a vertical velocity output; second means for deriving a vertical velocity signal including means responsive to change in the elevation of the meter providing a signal output, means operated by the signal of said elevation responsive means for providing a signal output in accordance with the rate of change of the elevation signal; means for comparing the output of said rate of change signal means and the output of said precession responsive signal means providing an error output in accordance with the difference therebetween, and torquing means to the input torque axis of the gyroscope operated by said error output means to correct the output of the precession responsive signal means.

2. A meter of the character claimed in claim 1, in which said elevation signal means is a barometric altimeter having a pick-off operated by the altimeter providing an output signal in accordance with change in elevation of the meter.

3. A meter of the character claimed in claim 1, including a second comparing means providing a corrected output signal having an input from the precession axis signal means of the gyroscope and a corrective input from the means providing the rate of change of elevation signal.

4. A meter for measuring vertical velocity including a vertical acceleration responsive means for deriving a vertical velocity signal comprising a gyroscope having a rotor frame, means for mounting the frame in an unbalanced condition about a horizontal torque input axis and a vertical precession output axis to subject the same to acceleration in a vertical direction, means for exerting a torque about the torque axis of the gyroscope to counterbalance the effect of gravity on the unbalanced frame, a pick-off controlled by precession of the gyroscope about its vertical axis providing a signal in accordance with the vertical velocity of the meter; second means for deriving a vertical velocity signal including an altimeter providing a signal output, means responsive to said altimeter signal for providing a signal output in accordance with the rate of change of the signal of the altimeter; means for comparing the output of said rate of change signal means and the output of said pick-off providing an error output in accordance with the difference between the signals, and a motor for exerting a torque about the torque axis of the gyroscope for correcting the signal of said pick-off operated by the error output signal of said comparing means.

5. A meter of the character claimed in claim 4, in which said altimeter is a barometric unit having a pick-off connected to said unit providing a signal in accordance with changes in altitude of the meter.

6. A meter of the character claimed in claim 4, including a second comparing means providing a corrected output signal having an input from the pick-off at the gyroscope and a corrective input from the means providing the rate of change of altitude signal.

7. A meter of the character claimed in claim 4, in which the mounting means for the gyroscope includes a vertical ring whose axis provides the precession axis of the frame, and said gravity counterbalancing torque means is provided by a coil spring having one end operatively connected to the frame and the other end operatively connected to the ring.

8. A device for measuring the rate of climb of an aircraft comprising vertical acceleration responsive means carried by the craft for deriving a signal in accordance with the vertical velocity of the craft including a gyroscope having a rotor frame, a vertical ring providing a precession output axis supporting said frame in an unbalanced condition about a horizontal torque axis to subject the same to acceleration in a vertical direction, means for exerting a torque about the torque axis of the gyroscope to counterbalance the effect of gravity on the unbalanced frame, stabilizing means for supporting said gyroscope on the craft to maintain a fixed orientation of the components thereof independent of the craft, a pick-off at the precession axis of the gyroscope providing a signal in accordance with the vertical velocity of the craft; second means for deriving a vertical velocity signal including an altimeter carried by the craft providing a signal output in accordance with change in altitude of the craft, means responsive to said altimeter signal for providing a signal output in accordance with the rate of change of the signal of the altimeter; means for comparing the output of said rate of change signal means and the output of said pick-off providing an error output in accordance with the difference between the signals, and a torque motor at the torque axis of the gyroscope for correcting the signal of said pick-off operated by the error output signal of said comparing means.

9. A device of the character claimed in claim 8, in which said altimeter is an aneroid bellows having a pick-off connected thereto providing a signal in accordance with changes in altitude of the craft.

10. A device of the character claimed in claim 8, including second comparing means providing a corrected output signal having an input from the pick-off at the gyroscope and a corrective input from the means providing the rate of change of altitude signal.

11. A device of the character claimed in claim 8, in which said gravity counterbalancing torque means is provided by a coil spring having one end operatively connected to the frame and the other end operatively connected to the ring.

12. In a meter for measuring vertical velocity, vertical acceleration responsive means for deriving a vertical velocity signal comprising a gyroscope having a rotor frame, a vertical ring providing a precession output axis supporting said frame in an unbalanced condition about a horizontal torque axis to subject the same to acceleration in a vertical direction, means for exerting a torque about the torque axes of the gyroscope to counterbalance the effect of gravity on the unbalanced frame, and signal means responsive to precession of the gyroscope providing a vertical velocity output.

13. A meter of the character claimed in claim 12, including means for smoothing the output of said signal means.

14. In a device for measuring the rate of climb of an aircraft, vertical acceleration responsive means carried by the craft for deriving a signal in accordance with the vertical velocity of the craft including a gyroscope having a rotor frame, a vertical ring providing a precession output axis supporting said frame in an unbalanced condition about a horizontal torque axis to subject the same to acceleration in a vertical direction, means for exerting a torque about the torque axis of the gyroscope to counterbalance the effect of gravity on the unbalanced frame, stabilizing means for supporting said gyroscope on the craft to maintain a fixed orientation of the components thereof independent of the craft, and a pick-off responsive to precession of the gyroscope providing a signal in accordance with the vertical velocity of the craft.

15. A device of the character claimed in claim 14, including means for smoothing the signal of said pick-off.

16. A device for measuring the rate of climb of an aircraft including vertical acceleration responsive means for deriving a signal in accordance with the vertical velocity of the craft comprising a gyroscope carried by the craft having, mutually perpendicular, torque input and precession output axes, signal means responsive to precession of the gyroscope providing an output in accordance with the vertical velocity of the craft; altimeter means carried by the craft providing a signal output in accordance with the rate of change of elevation of the craft; means for comparing the outputs of said gyroscope signal means and altimeter signal means providing an error output in accordance with the difference therebetween, and torquing means to the input axis of the gyroscope operated by said error output means to correct the output of the signal means of the gyroscope.

References Cited in the file of this patent

UNITED STATES PATENTS

| | | |
|---|---|---|
| 2,443,748 | Sanders | June 22, 1948 |
| 2,734,278 | Hammond | Feb. 14, 1956 |

FOREIGN PATENTS

| | | |
|---|---|---|
| 130,294 | Australia | Jan. 13, 1949 |